Patented Nov. 24, 1931

1,832,864

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REMOVING COLOR BODIES FROM ROSIN

No Drawing.   Application filed August 23, 1926.  Serial No. 131,124.

My invention relates to the purification of rosin and more particularly to the purification of wood rosin.

Wood rosin, as produced by known processes, such as the extraction of pine wood with a solvent, is a marketable product and while, for example, it is satisfactory for use in sizing most paper and in making dark colored varnishes, it is unsatisfactory for use in light colored papers and varnishes and it does not lend itself satisfactorily to the making of soaps.

Wood rosin, as heretofore produced, is particularly unsatisfactory for use in the production of soaps, since it contains soap discoloring bodies, which in the presence of the alkali in the soap and the oxygen in the air, are converted into brownish colored substances. Thus, a wood rosin soap on aging rapidly discolors, acquiring a dark brown discoloration zone on the exterior of the cake.

Heretofore various distillation methods have been provided for purifying wood rosin and rosin has been produced of a purity rendering it available for use in sizing the light colored papers and for use in light colored varnishes. Such methods, for example, as illustrated by the United States patent to Donk, No. 1,219,413, however, while enabling the production of wood rosin of a lighter color than, for example, gum H rosin, do not produce a rosin free from color bodies which darken in the presence of alkali and oxygen, and hence do not enable the production of a rosin usable in making soap. For example, a distilled wood rosin grading W. W. in color is very substantially lighter than a gum H rosin, yet the fresh soap obtained from the gum rosin is much lighter than that obtained from the wood rosin and while the gum rosin soap shows little discoloration on aging, the wood rosin soap rapidly discolors and a zone of dark brown discoloration forms on the exterior of the cake.

The peculiar behavior of the wood rosin apparently is caused by the presence in the wood rosin not only of visible color bodies, such as may be removed by known methods, but also latent color bodies, which, while harmless in many uses for the rosin, under certain conditions, as in the presence of alkali and oxygen, will discolor rendering the rosin relatively useless for the production of soap.

Now, it is the object of my invention to provide a method for the removal from wood rosin of the latent color bodies and the production of a wood rosin which will not discolor materially in the presence of an alkali and oxygen, as when used for the production of a soap.

In accordance with my invention, distilled wood rosin is treated by repeated simple distillation and redistillation, or more efficiently by distillation through a suitable fractionating tower.

As an example of the process involving my invention, a lot of distilled wood rosin is repeatedly distilled, the distillate in each instance being redistilled. The distillation should preferably be carried out under a pressure, of say about ½–1 inch of mercury and at a temperature of about 250–300° C.

In carrying out the process about 85% of the rosin charge will be distilled over in the first distillation and a black residue left. In the second distillation about 91% of the first distillate will distill over and a much lighter residue will remain. In subsequent distillations from about 94%–98% will distill over. The redistillation may be continued, but I have found that, under ordinary circumstances, if the rosin be redistilled three times, it will be satisfactory for use in making soap and a soap made from it will exhibit very little discoloration on aging.

In the carrying out of my process a satisfactory rosin may be produced by two distillations, if the conditions are carefully controlled, but generally speaking each redistillation improves the quality of the rosin, the degree of improvement decreasing with each successive redistillation. For example, the first distillation of the rosin gives more improvement than the second distillation and after about the fifth distillation there is generally no substantial improvement in the quality of the rosin.

As illustrative of an alternative method of carrying out my invention, the wood rosin may be distilled through a suitable fractionating column. The rosin is introduced into a still and distilled under reduced pressure at a temperature, for example, within the range 270°-330° C., and passed into a fractionating column maintained at a temperature, for example, within the range 260° to 290° C. The distillate may be collected in several cuts, comprising for example, 5%, 10%, 55% and 15% of the rosin. The distillation temperature will, since the distillation is carried out under reduced pressure, depend upon the pressure maintained within the apparatus and will also be influenced by the design of the apparatus selected and the rate of distillation.

The soaps derived from the several cuts vary somewhat, those derived from the first and last cuts being inferior to those derived from the middle cuts, which represent the greater portion of the distillate and yield soaps much superior in color to those obtained from rosin distilled once by simple distillations.

If desired, the rosin may be distilled with direct steam either repeatedly or through a fractionating column. However, where the fractionating column is employed the addition of the steam renders an adequate fractionation more difficult.

It will be understood that I do not intend that my invention shall be limited to the production of rosin for use in making soap, as the rosin produced may be utilized for various purposes where a highly refined rosin is desired.

Having now fully described my invention, what I claim and desire to protect by Letters Patent is:—

The method of removing from wood rosin latent color bodies having a tendency to darken in the presence of air and an alkali, which includes distilling wood rosin at a bath temperature within about the range 270° C.–330° C. and under reduced pressure such that substantial decomposition of the rosin will be avoided, passing the vapors through a fractionating column maintained at a temperature within about the range 260° C.–290° C. and collecting the distillate.

In testimony of which invention, I have hereunto set my hand, at Kenvil, New Jersey, on this 12th day of Aug., 1926.

IRVIN W. HUMPHREY.